3,474,127
PROCESS OF PRODUCING THERMOPLASTIC PREPOLYMERS FROM ALLYL ESTERS OF POLYBASIC ACIDS
Amleto Neri and Lorenzo Capitanio, Bergamo, Italy, assignor to Swiss Aluminium Ltd., Chippis, Switzerland, a joint stock company of Switzerland
No Drawing. Filed Sept. 24, 1965, Ser. No. 490,066
Claims priority, application Switzerland, May 17, 1965, 6,862/65
Int. Cl. C07c 69/80; C08f 3/60
U.S. Cl. 260—472          5 Claims

ABSTRACT OF THE DISCLOSURE

Producing thermoplastic prepolymers from allyl esters of polybasic acids by partially polymerizing the allyl ester in the presence of a catalyst in a solvent mixture of a monohydroxy aliphatic alcohol having from 1 to 3 carbon atoms and a halogenated aliphatic hydrocarbon such as carbon tetrachloride, trichloroethylene and tetrachlorethylene and tetrachlorethane.

---

The present invention relates to a process for producing thermoplastic prepolymers of allyl esters of polybasic acids which, by reason of their unsaturated nature, are subsequently hardenable through the action of heat in the presence of suitable catalysts. Such prepolymers are obtained by incomplete polymerization of the monomer materials in a solvent medium in the presence of a catalyst of the peroxide type. These prepolymers may be used alone or in mixture with other monomers or artificial resins for the production of moulding powders or moulding masses and of pre-impregnated material for the production of parts of any shape which are used in quantity in the fields of building, transport, or electrical or mechanical engineering in general. The prepolymer of diallyl phthalate is particularly suitable.

If allyl esters of polybasic acids, especially diallyl phthalate, are heated in the presence of catalysts of the peroxide type, first a linear or slightly cross-linked polymer of low molecular weight is produced. This polymer is partly unsaturated and soluble in acetone but is insoluble in methanol.

When the concentration of the prepolymers in the polymerization has reached about 25%, the polymerization mass begins to solidify by the formation of a cross-linked polymer. This polymer is characterized by its insolubility in acetone and a much reduced degree of unsaturation. The polymerization is therefore interrupted before the solidification of the mass, and the prepolymer is precipitated by the addition of low molecular weight alcohols such as methanol or isopropanol. The separation of the prepolymer is rather difficult and expensive; cooling to low temperature and high quantities of alcohol are necessary. The time at which the precipitation is carried out is determined by measurements of the viscosity of the polymerization mass.

The polymerization in fact does not take place in two sharply separated stages; during the prepolymerization, a part of the prepolymer formed is, in fact, further polymerized, so that the product which is obtained on the interruption of the reaction before solidification sets in is heterogeneous and only partly soluble in acetone and cannot be used for the purposes mentioned.

It has already been proposed to prevent or at least to delay the cross-linking during the initial polymerization by the addition of compounds having a blocking effect on the growth of the chains of the polymer. For this purpose, the polymerization has been effected in carbon tetrachloride, which shows this effect. However, only relatively low molecular weight prepolymers can be obtained in this way, and they are found to be too saturated and not suitable for further working.

According to the present invention, the initial polymerization is carried out in a solvent mixture consisting of a low molecular weight aliphatic alcohol having from 1 to 3 C-atoms and a halogenated aliphatic hydrocarbon. It has surprisingly been found that the use of this solvent mixture for the initial polymerization gives better results than the use of either solvent by itself. The resultant prepolymer is homogeneous and of consistent good quality and the process is economic, since only comparatively small amounts of solvents are needed.

The solvent mixture is advantageously used in an amount of from 0.5 to 15% by weight of the allyl ester being polymerized. By varying the ratio of the two solvents, it is also possible to obtain prepolymers with different molecular weights, but the molecular ratio of alcohol to halogenated hydrocarbon lies preferably between 2:1 and 10:1 to give homogeneous, completely acetone-soluble prepolymers.

Alcohols which may be used include monohydroxy methanol, ethanol and isopropanol and examples of halogenated hydrocarbon are carbon tetrachloride, trichloroethylene and tetrachlorethane. A mixture of methanol and carbon tetrachloride is preferred.

Allyl esters of a wide range of polybasic acids may be prepolymerized by the process according to the invention. Examples of other materials include halogenated compounds such as the allyl ester of tetrachlorophthalic acid, or dichlorodiallyl phthalate, or allyl esters of acids such as terephthalic acid, isophthalic acid, adipic acid, sebacic acid, or substituted or halogenated esters of any of these acids.

The prepolymerization of the allyl esters of polybasic acids according to the invention is carried out in the following way:

In a reaction vessel of stainless steel, the allyl ester, the solvent mixture and the catalyst are heated with constant stirring to a temperature of 100–140° C. advantageously to 105–120° C. Stirring is continued until the viscosity of the reaction mass has reached the value corresponding to the desired degree of conversion (usually from 25 to 35% of the initial monomers). Thereupon, the reaction mass is cooled to room temperature and the prepolymers are precipitated from the reaction mass by the addition of about 10 volumes of methanol, and filtered. After washing with methanol and with water and drying at 70–80° C., a white free-flowing powder is obtained.

The separated solvent contains the unpolymerized allyl ester, which can be separated in known manner, for example by distillation, and employed again in a new charge.

Some examples will now be given.

EXAMPLE 1

The reaction process described above was carried out having the following ingredients (by weight).

| Ingredients | A | B | C |
|---|---|---|---|
| Diallyl phthalate | 100 | 100 | 100 |
| Methanol | 4 |  | 2 |
| Carbon tetrachloride |  | 4 | 2 |
| Benzoyl peroxide | 0.4 | 0.4 | 0.4 |
| Molecular ratio, $CH_3OH/CCl_4$ |  |  | 4.8 |

In runs A and B, the polymerization mass solidified and yielded a product that was difficult to separate and that was completely unusable for further polymerization. Run C on the contrary gave after polymerization for 3½ hours at 110° C. a viscous liquid, which contained 27% prepolymer, and, after processing as described, gave a suitable product, which was completely soluble in acetone, and had a iodine number of 58.

EXAMPLE 2

In the following runs the ratio of the components of the solvent was varied.

| Ingredients | D | E | F | G | H | I |
|---|---|---|---|---|---|---|
| Diallyl phthalate | 100 | 100 | 100 | 100 | 100 | 100 |
| Methanol | 0.66 | 2.7 | 4 | 2.7 | 5.3 | 2 |
| Carbon tetrachloride | 2 | 1 | 2 | 2 | 4 | 4 |
| Molecular ratio, $CH_3OH/CCl_4$ | 1.6 | 13 | 9.6 | 6.5 | 6.5 | 2.4 |
| Benzoyl peroxide | 0.4 | 0.4 | 0.4 | 0.4 | 0.8 | 0.6 |

After 3½ hours, a degree of conversion between 27% (in Run D) and 36% (in Run H) was obtained in every case without solidification of the mass. The prepolymer could easily be isolated. Runs D and E however gave a product of minor quality (insufficient solubility in acetone) while the product of Runs F–1 was good and was completely soluble in acetone. These results show that the best products are obtained with a solvent mixture the components of which have a weight ratio of about 1:2.4 to 2:1 or (calculated as moles) from 2:1 to 10:1. The iodine number of the prepolymers of minor quality was found to be less than 55.

EXAMPLE 3

The prepolymerization process was carried out using as the solvent mixture 5.5 parts of isopropanol and 2 parts of carbon tetrachloride (molecular ratio 7:1) for each 100 parts of diallyl phthalate, and again using 2.7 parts of methanol and 3 parts of trichloroethylene (molecular ratio 3.8:1) for each 100 parts of diallyl phthalate. In each run, a prepolymer was obtained which was completely soluble in acetone; the prepolymer had iodine values of 58 and 60 respectively.

What is claimed is:

1. A process for producing thermoplastic prepolymers from allyl esters of phthalic acids, comprising partially polymerizing the allyl ester in the presence of a catalyst of the peroxide type in a solvent mixture consisting essentially of a member of the group consisting of methanol, ethanol, and isopropanol and a halogenated aliphatic hydrocarbon selected from the group consisting of carbon tetrachloride, trichloroethylene, and tetrachlorethane.

2. A process according to claim 1 in which the solvent mixture is present in an amount between 0.5 and 15% by weight of the allyl ester.

3. A process for producing thermoplastic prepolymers from allyl esters of phthalic acids, comprising partially polymerizing the allyl esters in the presence of a catalyst of the peroxide type, in a solvent mixture consisting essentially of methanol and carbon tetrachloride.

4. A process according to claim 1 in which the member of the group consisting of methanol, ethanol, and isopropanol and the halogenated aliphatic hydrocarbon are used in a molecular ratio of from 2:1 to 10:1.

5. A process for producing thermoplastic prepolymers from allyl esters of phthalic acids, comprising partially polymerizing the allyl ester in the presence of benzoyl peroxide in a solvent mixture consisting essentially of a member of the group consisting of methanol, ethanol and isopropanol and a member of the group consisting of carbon tetrachloride, trichloroethylene and tetrachlorethane.

References Cited

UNITED STATES PATENTS 2,482,056   9/1949   Elwell et al. _____ 260—33.8

JAMES A. PATTEN, Primary Examiner

E. J. SKELLY, Assistant Examiner

U.S. Cl. X.R.

260—78.4